(12) United States Patent
Nordhoff

(10) Patent No.: US 7,219,540 B2
(45) Date of Patent: May 22, 2007

(54) TIRE PRESSURE ADJUSTMENT SYSTEM

(75) Inventor: Hendrik Nordhoff, Havixbeck (DE)

(73) Assignee: Deere & Company, Moline, IL (US)

( * ) Notice: Subject to any disclaimer, the term of this patent is extended or adjusted under 35 U.S.C. 154(b) by 18 days.

(21) Appl. No.: 11/144,725

(22) Filed: Jun. 3, 2005

(65) Prior Publication Data

US 2005/0279160 A1    Dec. 22, 2005

(30) Foreign Application Priority Data

Jun. 19, 2004    (DE) .................. 10 2004 029 736

(51) Int. Cl.
*G01M 17/02* (2006.01)
(52) U.S. Cl. ....................... 73/146; 152/416
(58) Field of Classification Search ............... 73/146; 152/416, 417; 137/132, 225, 226
See application file for complete search history.

(56) References Cited

U.S. PATENT DOCUMENTS

| | | | |
|---|---|---|---|
| 3,451,460 A | | 6/1969 | Sipin |
| 4,280,546 A | * | 7/1981 | Mistretta ..................... 152/516 |
| 4,922,946 A | * | 5/1990 | Boulicault .................. 137/102 |
| 5,109,905 A | * | 5/1992 | Lambe ..................... 152/342.1 |
| 5,253,688 A | * | 10/1993 | Tigges ......................... 152/417 |
| 5,479,976 A | * | 1/1996 | Cho ............................ 152/518 |
| 5,647,927 A | | 7/1997 | Mason |
| 6,076,580 A | * | 6/2000 | Mazhar ................... 152/338.1 |
| 6,269,855 B1 | * | 8/2001 | Elgendi ................... 152/333.1 |

FOREIGN PATENT DOCUMENTS

| | | |
|---|---|---|
| DE | 38 86 010 | 10/1988 |
| DE | 40 10 711 | 10/1991 |
| DE | 198 04 249 | 2/1998 |
| DE | 196 51 063 | 6/1998 |
| GB | 663 265 | 12/1951 |
| GB | 1 550 537 | 8/1979 |
| GB | 2 258 195 | 7/1992 |

* cited by examiner

*Primary Examiner*—Andre Allen

(57) ABSTRACT

The invention concerns a tire pressure adjusting system for setting the pressure in a tire mounted on a vehicle. A pressure source assigned to the vehicle and at least one connecting line are provided, with which the pressure source can be connected to a tire. The tire can be mounted on a rim. Within the space formed between the tire and the rim, a dividing means is provided, with which the space can be divided into two chambers. In order to reduce the time period for a change in the tire pressure, a means of limitation be provided, with which the volume expansion of a chamber can be limited to a maximum volume value that can be set, and that to change the pressure of the tire only the pressure in one of the two chambers needs to be changed.

15 Claims, 2 Drawing Sheets

TIRE PRESSURE ADJUSTMENT SYSTEM

FIELD OF THE INVENTION

The present invention relates generally to tire inflation systems. More particularly, the present invention relates to a tire pressure adjustment system for setting the pressure in a tire mounted on a vehicle. Specifically, the present invention relates to a tire pressure adjustment system wherein a pressure source is assigned to the vehicle and at least one connecting line, with which the pressure source can be connected to a tire, are provided. The tire can be mounted on a rim. Within the space formed between the tire and the rim, a dividing means is provided, with which the tire volume can be divided into two chambers.

BACKGROUND OF THE INVENTION

Agricultural vehicles, such as tractors, combines, and trailers, as well as comparable vehicles that are used on soft ground, are often equipped with tires of large volume in order to achieve good land mobility, good traction properties, and adequate ground pressure. Traction and ground pressure are especially low when a low air pressure is set in the tire. As such, low tire pressure is preferred for field operations. However, with decreasing tire pressure, the pulling ability of the tires decreases, and tire wear and the resistance to rolling increase. In order to satisfy these conflicting demands, various tire-pressure regulating systems are used, as can be seen from DE 198 04 249 A1 or U.S. Pat. No. 5,647,927. With the aid of a tire-pressure regulating system, the air pressure in the tire can be adjusted optimally to the requirements of the particular work in which it is being used. The air pressure required to fill the tire using these tire-pressure regulating systems is supplied by a compressor, which feeds an air-pressure container.

Generally in order to generate a pressure that can be set, the space between the tire and the rim is filled with a gas, for example with air. Therefore, the pressure source is typically a compressor that sucks air in from the environment, compresses it, and directs it into the space formed by the tire and rim.

Furthermore, it is known in the art that an emergency system can be provided for vehicle tires, with which at least limited travel is possible even in the event of a tire blow out. Such an emergency systems typically consist of a hose arranged between the rim bed and the tire. In the event the tire blows out, travel on this hose is possible. Such an emergency tire system is known from GB2,258,195A, for example, which discloses a tire inflation system that includes means by which gas or air can be made available for inflating the tire. This emergency tire system is implemented in such a way that the tire pressure is kept essentially constant.

Adjusting tire pressure in the case of a large volume tires, as is common in agricultural vehicles, takes an undesirably long time, since a large volume of gas has to be moved into or out of the tire, and because only a limited gas flow can be directed through a valve on the tires, especially when traditional valves are provided.

Accordingly, there is a clear need in the art to provide a tire pressure adjustment system with which the above-mentioned problems can be overcome. In particular, by reducing the time period for changing the tire pressure.

SUMMARY OF THE INVENTION

According to the invention, a tire-pressure setting system of the kind mentioned above is characterized in that a means of limitation is provided with which the volume expansion of a chamber can be limited to maximum volume value that can be set, and that in order to change the pressure in the tire, only the pressure in one of the two chambers needs to be changed.

According to the invention, it is first recognized that a reduction in the gas volume to be exchanged during a pressure change in the tire can be achieved when a dividing means is provided in the space formed by the tire and the rim and whereby a means of limitation is provided, with which the volume expansion can be limited to a maximum volume value that can be set. In this way, in order to change the tire pressure, gas or air has to be removed from or added to only one of the two chambers. In the event that the pressure in this chamber falls below the pressure in the other chamber, an expansion of the volume of the other chamber is limited by the means of limitation, so that an average value with respect to volume and pressure can no longer be set in both chambers. Thus, a reduction in the air pressure in one chamber can be effected regardless of a reduction in the volume and air pressure in the other chamber, so that the tire pressure can be achieved by changing the pressure in one chamber, whereby the gas volume to be exchanged during a pressure change can be reduced and the duration of a pressure change can be shortened. Accordingly, in order to increase the pressure in one chamber, which is associated with an energy expense, less air has to be moved, because of the reduced tire volume. The elasticity or the spring characteristic of the wheel is determined by the pressure relationships in the chambers. With the tire pressure adjusting system according to the invention, the air pressure and/or the spring characteristic of the wheel can be set in an advantageous manner for the current use of the vehicle.

In a preferred embodiment, the dividing means is a hose. This hose could, for example, be made of an elastic material such as rubber. The hose could, however, be made of a air-tight fabric material. Here, the fabric material acts simultaneously as a limitation means, so that the material costs for this embodiment are advantageously low. The mounting of a hose and a tire onto a rim is not changed by this, in principle. The same applies to the manner of construction of tires and rims.

Alternatively, the dividing means could have a filling material. The filling material could be made of an elastic material, especially rubber. Mounting of the tire on the rim or the wheel will not therefore be made more difficult. Thus the dividing means formed by the filling material can be applied in the tire first, then the tire is applied to the rim with the dividing means.

The filling material can have pores or be in the form of a foam. In this case, the filling or connecting material has different elastic properties and correspondingly another spring characteristic. Thus, by a suitable selection of the filling or connecting material, a spring characteristic can be set for the wheel that is appropriate to the condition of the wheel, in which one chamber is almost devoid of air or pressure and in which the overall spring characteristic of the wheel then corresponds essentially to that of the filling or connecting material.

Preferably, the dividing means is formed in the shape of a torus. Thus the dividing means can be made like a traditional inner tube, which makes a cost-favorable production of the tire pressure-setting system according to the invention possible. The dividing means could then be arranged on the rim and/or be attached to it.

In a preferred embodiment, the means of limitation has a net or a fabric of a set maximum size. With this, an effective volume expansion beyond the maximum volume value of the chamber is no longer possible, specifically, for example, the chamber that is completely surrounded by the net or the fabric. Creation of a means of limitation in the form of a net or a fabric is possible in an advantageously cost-favorable manner.

It is preferred that in one of the chambers formed by the dividing means the pressure remains essentially unchangeable, and it could correspond to a usual tire pressure for street travel. Correspondingly, for a change in the tire pressure, the pressure in the other chamber is varied. The chamber with the essentially unchanged pressure could be arranged at the rim. In this case, the pressure in the outer chamber would be varied to change the pressure in the tire. The rim would be extensively protected from damage in an advantageous manner through the low gas pressure of the wheel, because the so-called inner chamber always has a minimum pressure and correspondingly the rim or the tire can roll on it without the rim—even in case of an impact or unevenness—coming into contact with the ground below it.

In a preferred embodiment, a change in the tire pressure can be achieved by changing the tire pressure by filling or emptying a chamber arranged between the dividing means and the tire. In other words, the pressure of the outer chamber—with respect to the rim—varies whereby the pressure, and in some circumstances the volume, of the inner chamber remains unchanged, specifically when the means of limitation prevents a further expansion of the inner chamber under the existing pressure relationships.

Although, in order to change the pressure of a tire, only the pressure in one of the two chambers is to be changed, in a preferred embodiment it is also envisioned that in order to change the tire pressure or the pressure relationships in the two chambers, air can be directed from one chamber into the other. In this way, even without a significant energy expense, the air pressures in the two chambers can be brought closer together, by which, at least partially, a pressure balance between the chambers can be promoted between the chamber with the higher pressure and the chamber with the lower pressure. Since in this case, the spring properties of the two chambers change, the spring properties of the whole tire also change.

Further, each chamber could be provided with a valve, through which the pressure in each chamber can be varied. Under certain circumstances, which of the two chambers it is reasonable to empty of or fill with air, will depend on the pressure relationships or volume relationships in the two chambers and to the specific design of the means of limitation. For this, a control device could be provided in one or each chamber, whereby pressure sensors detect the pressures in the chambers assigned to them and transmit them in the form of electrical signals. A pressure sensor could also be arranged at a valve. The control device could, in turn, control the valves or valve of each chamber and connect them/it either to the environment or to the pressure source, so that the pressure in one or both chambers can be varied.

Especially preferred is a pressure source for the tire-pressure setting system that can be connected selectively to at least one chamber. In case one chamber is connected to the pressure source, the corresponding chamber is filled. A simultaneous connection of both chambers to the pressure source can likewise be provided, in order to fill both chambers simultaneously.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
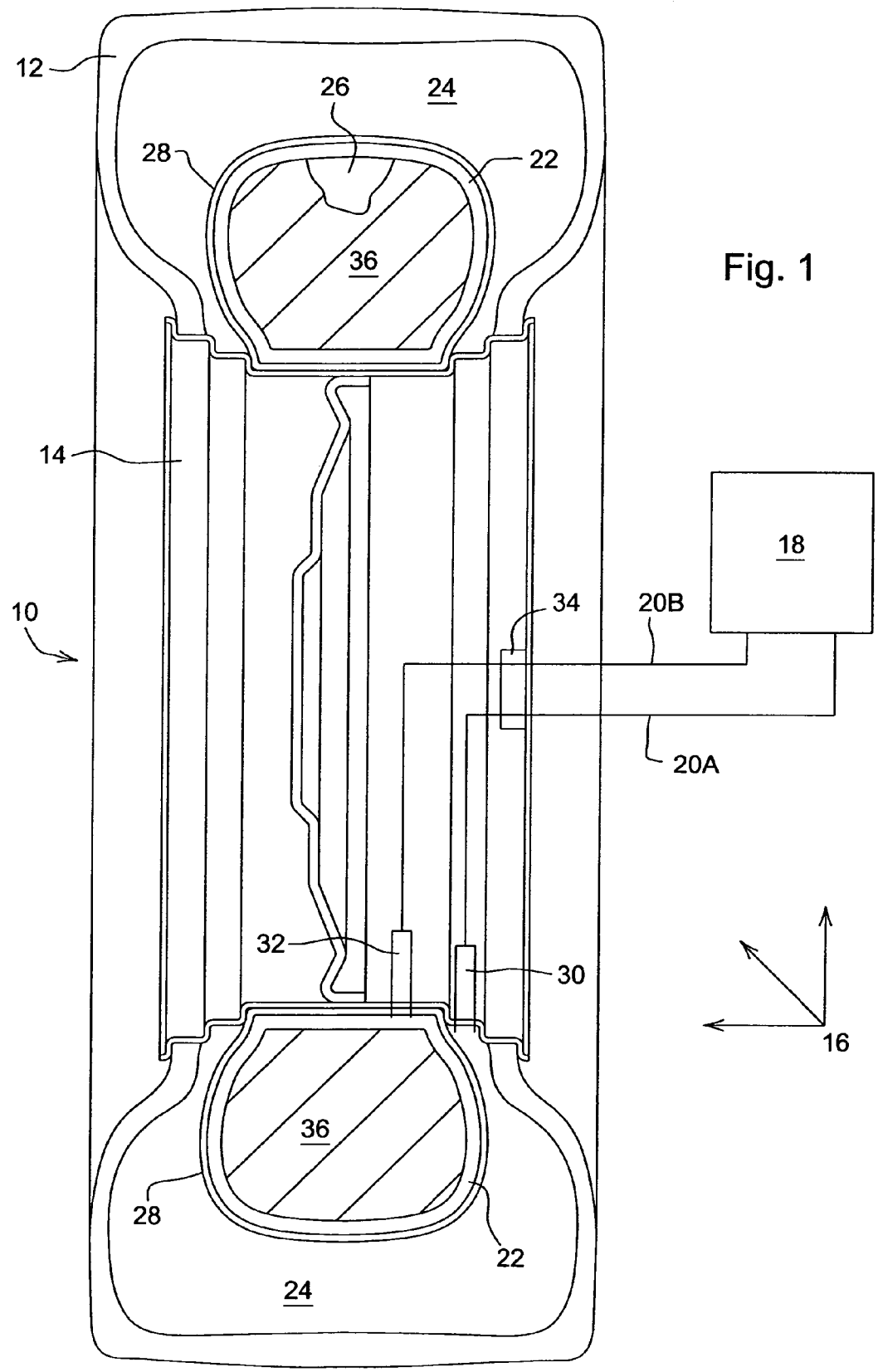
FIG. 1 is a schematic cross-section, and embodiment example of the present invention in a first state; and, FIG. 2 is a schematic cross-section, the example of embodiment from FIG. 1 in a second state.
Figure 2:
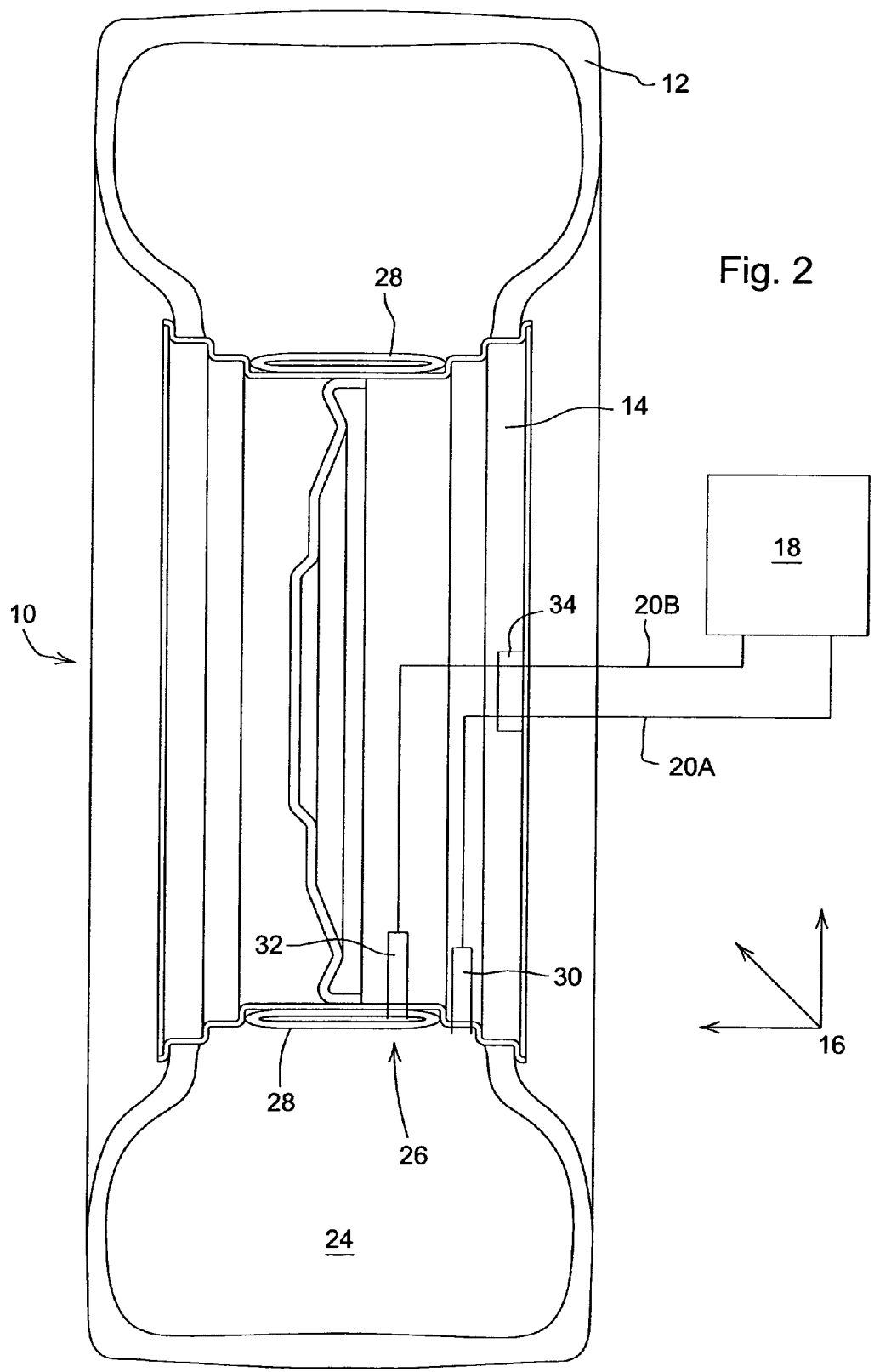

With reference now to the drawings it can be seen that FIGS. 1 and 2 each show, in cross-section, a wheel 10, which has a tire 12 and a rim 14. The wheel 10 is mounted so as to rotate on a vehicle, not shown. Four wheels 10 are provided on the vehicle. The vehicle includes a tire pressure adjusting system 16, which has a pressure source 18. The pressure source 18 is preferably constructed in the form of a compressor and can be driven by the internal combustion engine of the vehicle—not shown in FIGS. 1 and 2. In other words, the compressor involves a compressed-air source that sucks in air from the environment and compresses it. The tire pressure adjusting system 16 includes connecting lines 20, with which the pressure source 18 is connected to the tire 12 or the wheel 10.

The tire 12 has a dividing means 22, with which the tire volume can be divided into two chambers 24, 26. The dividing means 22 is constructed in the form of a hose that consists of an elastic material, preferably rubber. In the state of the dividing means 22 shown in FIG. 1, it will be recognized that the dividing means 22 is constructed essentially in the shape of a torus. The dividing means 22 is arranged on the rim 14.

As shown, a means of limitation 28 is provided, with which the volume expansion of the chamber 26 can be limited to maximum value that can be set. The means of limitation 28, in the state shown in FIG. 1, has reached its maximum size. Accordingly, the volume of chamber 26 cannot expand beyond the state shown in FIG. 1, although under certain circumstances, because of the pressure relationships prevailing in the chambers 24, 26, it would be possible without a means of limitation 28 being provided, because of the elastic properties of the means of division 22.

In the tire 12, it is provided that the pressure prevailing in chamber 26 remains essentially unchanged and corresponds essentially to the tire pressure for street travel. To change the pressure in the tire, therefore, only the pressure in the outer chamber 24 is changed. For this, either air is partly released from chamber 24 or else air is provided to the chamber 24 from the pressure source 18 through the connecting line 20.

The means of limitation 28 is preferably a fabric of a maximum size that can be set, and surrounds the dividing means 22 completely. Thus the means of limitation 28 is also constructed in the shape of a torus, at least in the state shown in FIG. 1.

Chamber 24 is connected to the pressure source 18 through valve 30 and the first connecting line 20A. Chamber 26 is connected to the pressure source 18 through valve 32 and a second connecting line 20B. Although the pressure in chamber 26 is to remain essentially unchanged, in the embodiment of FIGS. 1 and 2 this chamber is also assigned to a valve 32 and connecting line 20B, so that the air pressure in this chamber 26 can also be varied with the tire pressure adjusting system 16. A rotary passage or rotary connection 34, which connects the rotating part of connecting lines 20 to the part of connecting lines 20 that are solidly attached to the vehicle, is indicated only schematically.

It will be recognized that the dividing means could have a filling material made of an elastic material, especially rubber that would occupy the chamber 26 (or 24?). The filling material can have pores or be in the form of a foam. In this case, the filling or connecting material has different elastic properties and correspondingly another spring characteristic. Thus, by a suitable selection of the filling or connecting material, a spring characteristic can be set for the wheel that is appropriate to the condition of the wheel, in which the chamber 26 (or 24?) is almost devoid of air or pressure and in which the overall spring characteristic of the wheel then corresponds essentially to that of the filling or connecting material.

FIG. 2 shows the wheel 10 in a state in which chamber 26 is almost devoid of air, in which therefore air from chamber 26 can be admitted through valve 32.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in wich an exclusive property or prvilege is claimed are defined as follows:

1. A tire pressure adjusting system for adjusting the pressure of a tire mounted on a vehicle using a pressure source on the vehicle and at least one connecting line with which the pressure source is connected to a tire, the tire being mounted on a rim and within a space formed between the tire and the rim, a dividing means is provided, by which the space is divided into two chambers, and wherein within the formed between the tire and the rim a means of limitation is also provided, by which the volume expansion of a chamber is limited to a maximum volume value, and that the pressure of the tire, is increased or decreased by adjusting the pressure in either of the two chambers.

2. A tire pressure adjusting system according to claim 1, wherein the dividing means is a hose that is made of an elastic material.

3. A tire pressure adjusting system according to claim 1, wherein the dividing means has an elastic filling material.

4. A tire pressure adjusting system according to claim 3, wherein the filling material is porous.

5. A tire pressure adjusting system according to claim 3, wherein the filling material is in the form of a foam.

6. A tire pressure adjusting system according to claim 1 wherein the dividing means is constructed in the shape of a torus.

7. A tire pressure adjusting system according to claim 1 wherein the dividing means is placed on or attached to the rim.

8. A tire pressure adjusting system according to claim 1 wherein the means of limitation is a net or fabric of a maximum size that is set and that the dividing means is surrounded by the means of limitation in at least some regions.

9. A tire pressure adjusting system according to claim 1 wherein in one of the chambers formed by the dividing means the pressure remains essentially unchanged.

10. A tire pressure adjusting system according to claim 9 wherein the chamber with the essentially unchanged pressure is arranged at the rim.

11. A tire pressure adjusting system according to claim 1 wherein a change in the tire pressure is achieved by filling or emptying the chamber arranged between the dividing means and the tire.

12. A tire pressure adjusting system according to claim 1 wherein in order to change the pressure relationships in the two chambers, air can be directed from one chamber into the other chamber.

13. A tire pressure adjusting system according to claim 1 wherein a valve is assigned to at least one chamber, through which valve the pressure in the at least one chamber can be changed.

14. A tire pressure adjusting system according to claim 1 wherein the pressure source is selectively connected to both chambers.

15. A tire pressure adjusting system according to claim 1 wherein the pressure source can be selectively connected to both chambers simultaneously.

* * * * *